United States Patent
Zhu (10) Patent No.: US 11,960,732 B2
(45) Date of Patent: Apr. 16, 2024

(54) METHOD FOR IDENTIFYING HARD DRIVE TRANSITIONALLY AND FINALLY WITH DRIVE LETTER IDENTIFICATION AND ELECTRONIC DEVICE

(71) Applicant: Fulian Precision Electronics (Tianjin) Co., LTD., Tianjin (CN)

(72) Inventor: Jian-Hua Zhu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 83 days.

(21) Appl. No.: 17/891,543

(22) Filed: Aug. 19, 2022

(65) Prior Publication Data
US 2023/0400989 A1    Dec. 14, 2023

(30) Foreign Application Priority Data
Jun. 14, 2022   (CN) .......................... 202210671763.3

(51) Int. Cl.
*G06F 3/06* (2006.01)

(52) U.S. Cl.
CPC .......... *G06F 3/0619* (2013.01); *G06F 3/0644* (2013.01); *G06F 3/0659* (2013.01); *G06F 3/0683* (2013.01)

(58) Field of Classification Search
CPC .... G06F 3/0619; G06F 3/0644; G06F 3/0659; G06F 3/0683
See application file for complete search history.

(56) References Cited

U.S. PATENT DOCUMENTS

2010/0131693 A1* 5/2010 Chien ................. G06F 11/3485
711/E12.001

FOREIGN PATENT DOCUMENTS

TW           I335524 B         1/2011

* cited by examiner

*Primary Examiner* — Jae U Yu
(74) *Attorney, Agent, or Firm* — ScienBiziP, P.C.

(57) ABSTRACT

A method for allocating a drive letter to hot-swapped, newly-inserted, or doubly-identified hard disks obtains a number of hard disks connected and information of each device, the device information comprises slot information of the hard disk. A transitional drive letter is allocated to the hard disk according to their number and information of those devices, the transitional drive letter comprises a slot number corresponding to the slot information. A system drive letter is reallocated to the hard disk according to an order of the drive letter issued as a transitional drive letter. An electronic device and a non-volatile storage medium therein, for performing the above-described method, are also disclosed.

20 Claims, 5 Drawing Sheets

METHOD FOR IDENTIFYING HARD DRIVE TRANSITIONALLY AND FINALLY WITH DRIVE LETTER IDENTIFICATION AND ELECTRONIC DEVICE

FIELD

The subject matter herein generally relates to field of computing, more specifically to a method for calibrating drive letter and an electronic device.

BACKGROUND

A server can be equipped with multiple slots to hold multiple hard disks. A central processor of the server can assign drive letters to multiple hard disks inserted in slots according to preset rules. When the operator needs to read files stored in a particular hard disk, or the system needs to retrieve the files stored in a particular hard disk, he can obtain the file directory of the hard disk according to the drive letter and obtain the files. When the hard disk is hot swapped in the slot or the system fails to allocate a drive letter, the system does not allocate a drive letter to the hard disk according to the preset rules. The operator or the system cannot find or call up the files in the hard disk according to the original drive letter, which has the defect of inconvenient use.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
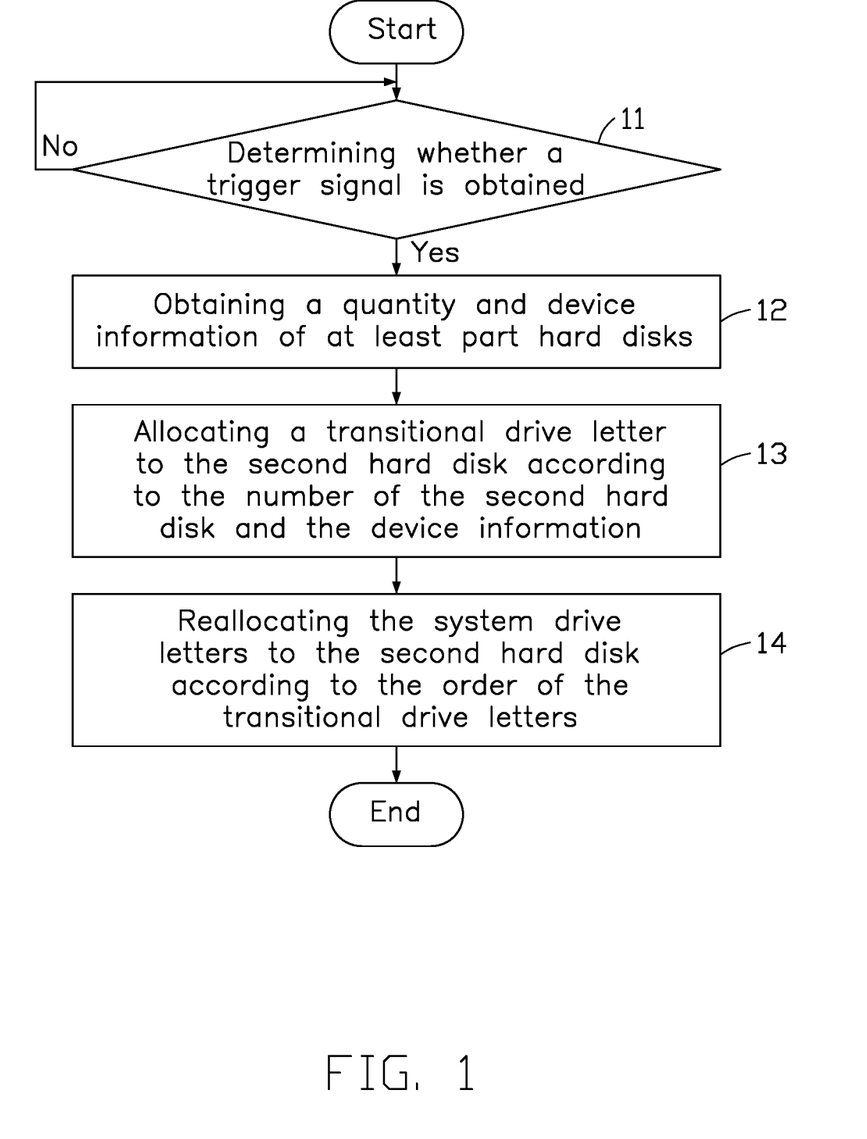
FIG. 1 is flowchart of an embodiment of a method for allocating drive letter to a connected disk according to the present disclosure.

FIG. 1 shows a flowchart of one embodiment of a method for allocating drive letter to a connected disk of the present disclosure. The method is used to resolve a drive letter drift problem when the hard disk is hot swapped in a slot or the system allocation fails.

Multiple hard disks can be set in a server. After the system runs, the system can assign a system drive letter to each of multiple hard disks according to preset rules. The operator can find the hard disk through the system drive letter to read files in the hard disk. The server can also call up the files in the hard disk through the system drive letter when running the program.

For example, the server can be a server running the Linux system, which assigns a system drive letter according to the scanned hard disk sequence. The system drive letter can be sda, sdb1, sdb2, . . . , sdz, etc., in which the alphabetical order of English letters such as a and b corresponds to the order in which the system recognizes multiple hard disks, and the numbers such as 1 and 2 correspond to the partition number preset for each partition in a hard disk. The server can assign system drive letters to multiple hard disks according to the order of English letters and numbers in the system drive letters, from small to large or otherwise.

The problem of drive letter drift is the problem of the server not assigning system drive letters to multiple hard disks according to presets, such as applying another system drive letter to a hard disk that has already been assigned a system drive letter, resulting in confusion of system drive letters. When the drive letter drifts, it is difficult for operators and the Linux system to obtain the files in a particular hard disk according to the original directory.

When the Linux system is running, the installation location of the hard disk can be obtained according to the pre-stored programs or open-source tools, that is, the specific slot where the hard disk is inserted is the installation location. The Linux system can assign a system drive letter to a hard disk according to the order of insertion of the slots in the server.

For example, the Linux system can obtain the slot information corresponding to a hard disk. The contents of the slot information can be slot1, slot2, . . . , slotn, etc., where n is a constant. The digital part n in the slot information content represents the slot corresponding to the slot information being the nth slot in the server. The digital part of the slot information can correspond to the order in which the Linux system recognizes multiple hard disks. The Linux system can assign drive letters to multiple hard disks in order according to the order of the digital part in the slot information corresponding to multiple hard disks, such as assigning drive letter sda to hard disk in slot1, assigning drive letter sdb to hard disk in slot2, etc.

Before the method provided by the embodiment of the application runs, the Linux system has completed an initial allocation of the system drive letters.

Figure 7:
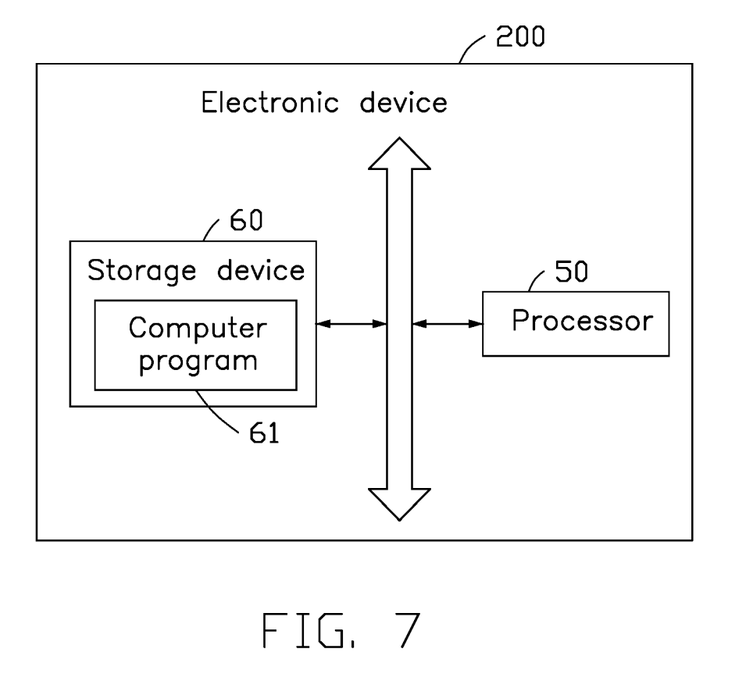
FIG. 7 is block diagram of an embodiment of an electronic device according to the present disclosure.

In the embodiment, the method can be run in a processor 50 (shown in FIG. 7).

As shown in FIG. 1, the method according to the embodiment of the present disclosure includes the following steps:

At block 11, determining whether a trigger signal is obtained. If the trigger signal is obtained, block 12 is implemented, otherwise the process returns to block 11.

The processor 50 runs other steps of the method after determining that the trigger signal has been obtained. In the embodiment of the present disclosure, the output end of the trigger signal is not limited.

In a first implementation, the trigger signal may be automatically generated by the processor 50. For example, the trigger signal can be automatically generated at a time point preset by the operator. For another example, the trigger signal can be set to be automatically generated when the server is turned on and running. For another example, the trigger signal can be generated automatically after the processor 50 determines that a hard disk in a slot is missing or that a new hard disk is added in a slot, that is, a hot plugging occurs in a slot.

The processor 50 can monitor whether a hard disk is hot swapped in the slot according to the preset program or an open-source tool. Drive letter drift during the hot plugging of hard disk may be catastrophic, it is necessary to allocate a system drive letter through other steps in the method to resolve the drive letter drift problem, when a hot plugging of hard disk occurs.

In a second implementation, the trigger signal may be output by the operator to the processor 50 through the user terminal (not shown in the figures). The user terminal may establish communication connection with the processor 50. The user terminal can be an electronic device 200 with human-computer interaction, data processing, and communication functions. The user terminal can be but not limited to personal computers, smart phones, tablets, smart watches.

The communication connection can be a wireless communication connection realized through a wireless network, or a wired communication connection realized through a wire, data line, etc., which is not limited by the embodiment of the present disclosure.

In a third implementation, the trigger signal may be output by the detection device (not shown in the figure) to the processor 50. The detection device may establish communication connection with the processor 50. The detection device is used to detect whether there is hard disk plugged in the slot. The detection device can be a sensor with object motion detection function, and the detection device can be, but is not limited to, an infrared sensor.

After detecting the insertion of the hard disk in the slot, the detection device outputs a trigger signal to the processor 50. When the server is working, a hot plugging of the hard disk is easy to cause the drift of the system drive letter, so at this time, the processor 50 can run other steps of the instant method to allocate the system drive letter.

At block 12, obtaining a quantity and device information of at least some hard disks.

The device information includes slot information and partition information. The slot information corresponds to the slot in which the hard disk is inserted. The partition information corresponds to whether the inserted hard disk has partitions and the number and serial numbers of partitions.

Operators can partition the hard disk according to the requirements of file classification, so as to generate multiple independent storage spaces in a hard disk. When partitioning the hard disk, the operator sets the storage capacity, the number of partitions, and the serial numbers of partitions. Before the method provided in the embodiment of the present disclosure runs, the partitions have been made, and the number, serial numbers, and other information of the partitions are known information.

The installation position of the hard disk on the server may include a body slot and an external slot. The body slot can be the slot on the motherboard of the server, and the external slot can be the slot attached to the external device installed on the motherboard. The hard disk may include a first hard disk and a second hard disk. The first hard disk is connected to the body slot, and the second hard disk is connected to the external slot.

The motherboard of the server can be provided with one or more slots, and the hard disk connected to the slots on the main board can be used to store the running programs of the Linux system. The external devices with the slots can also be installed on the main board of the server, such as host bus adapter (HBA) and its accessory devices. The hard disk inserted in the slot of the external device can be used to store the files and programs required by the operator.

When a hard disk is inserted in both the body slot and the external slot, the server starts up and runs. The processor 50 preferentially allocates a system drive letter to the first hard disk on the body slot, then obtains the information fed back by the external device and continues to allocate a system drive letter to the second hard disk on the external slot according to the information fed back by the external device. The information fed back by the external device may be the number of the second hard disks on the external slot and devices information. The system drive letter of the first hard disk on the body slot does not have the problem of drive letter drift caused by system failure or hard disk hot swapping, it is only the system drive letter of the second hard disk on the external slot has the problem of drive letter drift caused by system failure or hard disk hot swapping. A system fault may include a fault caused by information fed back from the external device to the processor 50, or a fault caused by an error in reading information fed back from the external device by the processor, and the like. Therefore, at least some of the hard disk described in block 12 may be a second hard disk.

In the embodiment, the first hard disk may be a hard disk storing the system running software of the server, for example, the first hard disk may be a hard disk storing the Linux system running software. The second hard disk may be used to store files, programs. The embodiments of the present disclosure do not limit the numbers of the first hard disk and the second hard disk.

In the above scenario, the first hard disk does not have the problem of drive letter drift caused by system failure or hard disk hot swapping.

Figure 2:
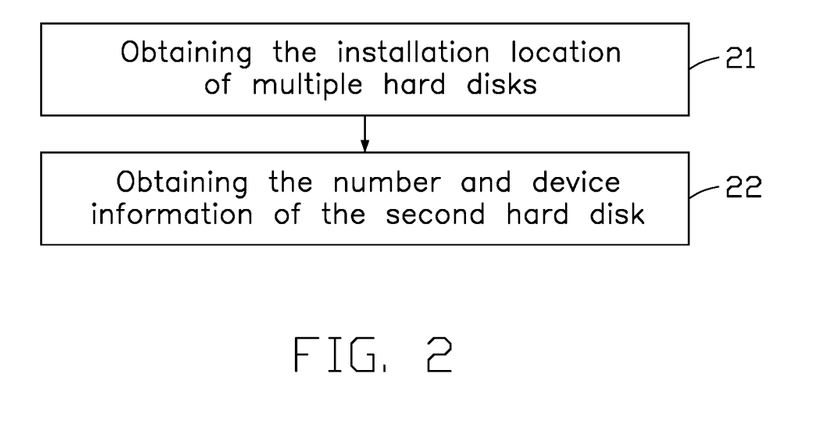
FIG. 2 is flowchart of another embodiment of method.

Referring to FIG. 2, in the above scenario, the method of obtaining the number of at least some hard disks and devices information may include the following steps:

At block 21, obtaining the installation locations of multiple hard disks.

The present disclosure can obtain the installation location of each hard disk according to the preset program or open-source tools. For example, the present disclosure can obtain the slot information of each hard disk according to a preset program or an open-source tool. The number and serial numbers of the body slots and the number and serial numbers of the external slots in the server can be known before the operation of the drive letter method. The slot information corresponding to the body slot may be known, and the slot information corresponding to the external slot may also be known. Therefore, when the processor 50 acquires the slot information, it can synchronously acquire the slot information, and the corresponding hard disk is located in the body slot or the external slot.

At block 22, obtaining the number and devices information of the second hard disks.

In the scenario where the first hard disk is inserted into the body slot and the second hard disk is inserted into the external slot, the second hard disk is at least one part of the hard disk described in block 12.

When the Linux system is running, the processor 50 can obtain the number of hard disks on the external slot and the device information of each hard disk corresponding to the external slot through a pre-stored program or an open-source tool.

For example, on a server running a Linux system and externally connected with a host bus adapter and its accessory devices, the processor 50 can query the number of hard disks and device information inserted in the slots of the host bus adapter and its accessory devices under the/sys/class/block directory through the preset "lsscsi-ktL" or "udevadm info-q path" commands, that is, the number and devices information of the second hard disk.

In the embodiment, the processor 50 can obtain a device directory corresponding to the second hard disk through a pre-stored program or an open-source tool, and the device directory includes one or more subdirectories. When there are multiple subdirectories, the subdirectories correspond to multiple second hard disks or multiple partitions of the second hard disk. The name of the subdirectory can include device name, partition name, and slot information. The device name corresponds to the hard disk, and the partition name corresponds to the partition in the hard disk.

The name of the subdirectory may include the current system drive letter of the hard disk. The format and content of the device name can be the same as the English part of the system drive letter, and the format and content of the partition name can be the same as the digital part of the system drive letter. For example, the system drive letter can be sda, sdb1, sdb2, . . . , sdz, etc. The order of English letters such as a and b can correspond to the order of multiple hard disks recognized by the system, and the numbers such as 1 and 2 correspond to the partition number preset for each partition in the hard disk. The device name is sda, sdb, . . . sdz, etc., and the partition name is 1, 2, etc.

In the embodiment, the processor 50 can acquire the number of hard disks according to the number of different device names in the device directory. For example, the device name can be sda, sdb, . . . sdz, etc. The processor 50 can count the different English letters that appear in the last digit of the device name, and the count result is the number of the hard disks.

In the embodiment, the processor 50 can acquire partition information corresponding to each second hard disk according to the number of subdirectories with the same device name in the device directory and the contents of partition names in a plurality of subdirectories with the same device name. For example, if there are three subdirectories with the device name sdb, and the partition names in the three subdirectories are 1, 2, and 3, it can be determined that the second hard disk corresponding to the device name sdb has three partitions, and the partition numbers are 1, 2, and 3.

In the embodiment, the name of the subdirectory may include the system drive letter and the slot information.

The names of multiple subdirectories can appear simultaneously and completely in the device directory. The embodiments of the present disclosure do not limit the sequence of the steps of obtaining the number of hard disks, obtaining the partition information, and obtaining the slot information.

The first hard disk does not have the drive letter drift problem caused by system failure or hard disk hot swapping, therefore the present disclosure can only obtain the number and device information of the second hard disk to solve the drift problem of the system drive letter, and the device information of the first hard disk may not be considered. The present disclosure can reduce the acquisition of equipment information and improve the operation efficiency of the drive letter calibration method.

At block 13, allocating a transitional drive letter to the second hard disk according to the number of second hard disks and the devices information.

It can be understood that the hard disk that has acquired the device information is the second hard disk described in block 22.

The transitional drive letter can be a drive letter different from the system drive letter format. In the embodiment, the transitional drive letter may include a slot number. The slot number corresponds to the slot information in the device information. For example, the format of the transitional drive letter can be sdslot $\alpha$, where $\alpha$ is the slot number, the slot number $\alpha$ is a constant, which is used to indicate that the hard disk is plugged into the $\alpha$th slot of the multiple external slots.

Figure 3:
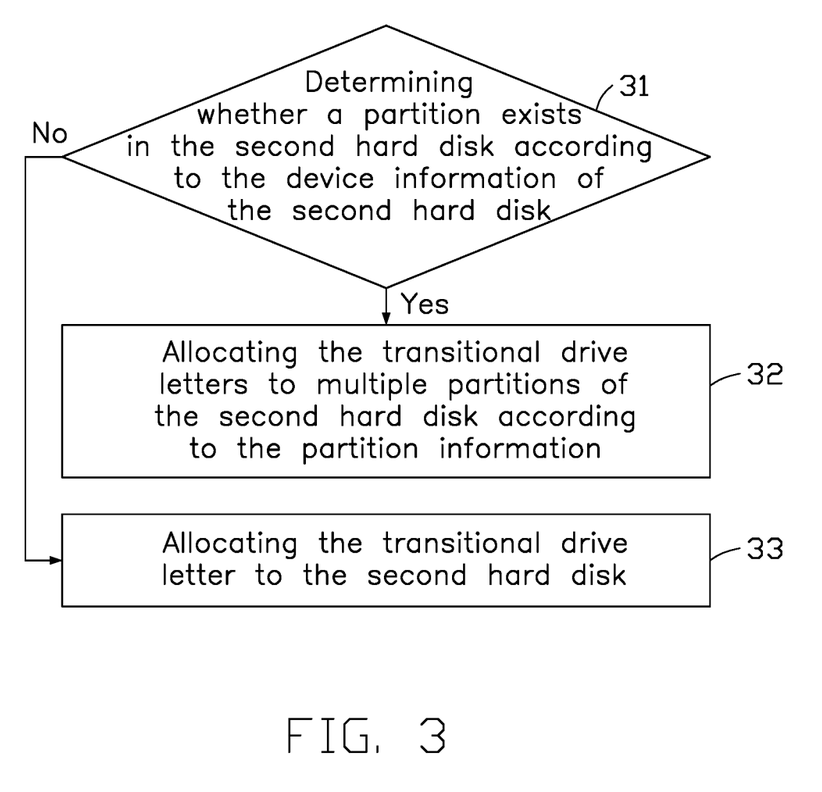
FIG. 3 is flowchart of another embodiment of method.

Referring to FIG. 3, in some embodiments, the method of allocating a transitional drive letter to the second hard disk may include the following steps block 31 to 33:

At block 31, determining whether a partition exists in the second hard disk according to the device information of the second hard disk. If the partition exists in the second hard disk according to the device information of the second hard disk, block 32 is implemented, otherwise block 33 is implemented.

It can be understood that according to the partition information in the device information of the second hard disk acquired in block 22, it can be determined whether there is a partition in the second hard disk.

The number of second hard disks may be one or more. When the number of the second hard disks is plural, it is possible to determine whether there is a partition for each second hard disk.

At block 32, allocating the transitional drive letters to multiple partitions of the second hard disk according to the partition information.

The transitional drive letter may include the partition transitional drive letter and the hard disk transitional drive letter. The partition transitional drive letter corresponds to the partition of the hard disk, and the partition transitional drive letter includes the slot number and the partition number.

The partition information may include the number and serial numbers of partitions in a hard disk. The partition number corresponds to the serial number of each partition in a hard disk. For example, the format of the partition transitional drive letter can be sdslot $\alpha$ part $\beta$, where $\alpha$ is the slot number, $\beta$ is the partition number, and the slot number $\alpha$ and the partition number $\beta$ are constants. The slot number $\alpha$ is used to indicate that the hard disk is plugged into the $\alpha$th slot of the multiple external slots. The partition number $\beta$ is used to indicate that the partition is the $\beta$th of multiple partitions in the hard disk.

At block 33, allocating the transitional drive letter to the second hard disk.

In block 33, a hard disk transitional drive letter may be assigned to the second hard disk that does not have a partition. The hard disk transitional drive letter may include a slot number. The slot number corresponds to the slot information in the device information.

In one embodiment, the format of the hard disk transitional drive letter can be sdslot $\alpha$, where $\alpha$ is the slot number, and $\alpha$ is a constant. The slot number $\alpha$ is used to indicate that the hard disk is plugged into the $\alpha$th slot of the multiple external slots. In another embodiment, the format of the hard disk transitional drive letter may be the same as that of the partition transitional drive letter, the format of the hard disk transitional drive letter can be sdslot $\alpha$ part0, where $\alpha$ is the slot number, and $\alpha$ is a constant, part0 indicates that there is no partition in the hard disk. The embodiments of the present disclosure are not limited thereto.

When there is a plurality of second hard disks, blocks 31 to 33 may be run once for the plurality of second hard disks to allocate transitional drive letters to the plurality of the second hard disks.

At block 14, reallocating the system drive letters to the second hard disk according to the order of the transitional drive letters.

The transitional drive letter can include the slot number and the partition number. The slot number and the partition number are constants that can be sorted from small to large. In the system drive letter, when the system drive letter is reallocated to the hard disk, the system drive letter can be reallocated to the hard disk according to the order of the slot number and the partition number in the allocated transitional drive letter.

In one embodiment, the processor 50 allocates a transitional drive letter to the second hard disk according to the order of the digital part in the slot information corresponding to the second hard disk from small to large and the order of the partition number in the partition information from small to large. Therefore, the order of allocation of the transitional drive letters is the order of the transitional drive letters. The processor 50 may record the order in which the transitional drive letter is allocated when the transitional drive letter is allocated. When the system drive letter is reallocated to the second hard disk, the processor 50 may allocate the system drive letter to the partition of the second hard disk and the second hard disk corresponding to the transitional drive letter one by one in the allocation order of the transitional drive letter.

In another embodiment, the processor 50 allocates the transitional drive letter from first to last according to the original system drive letter of the second hard disk. When there is a drive letter drift problem, the order in which the processor 50 allocates the transitional drive letter is different from the order in which the slot number and the partition number in the transitional drive letter are sorted from small to large. Before the operation of block 14, the processor 50 may first obtain the order of the transitional drive letter according to the slot number and the partition number of the allocated transitional drive letter from small to large, and then reallocate the system drive letter to the second hard disk according to the obtained order.

The first hard disk does not have the problem of the drive letter drift caused by the system fault or the hot swap of the hard disk, only the second hard disk, thus a system drive letter can be allocated only to the second hard disk. The present disclosure only reallocates the system drive letter of part of hard disks, which can improve the operation efficiency of the drive letter method.

Figure 4:
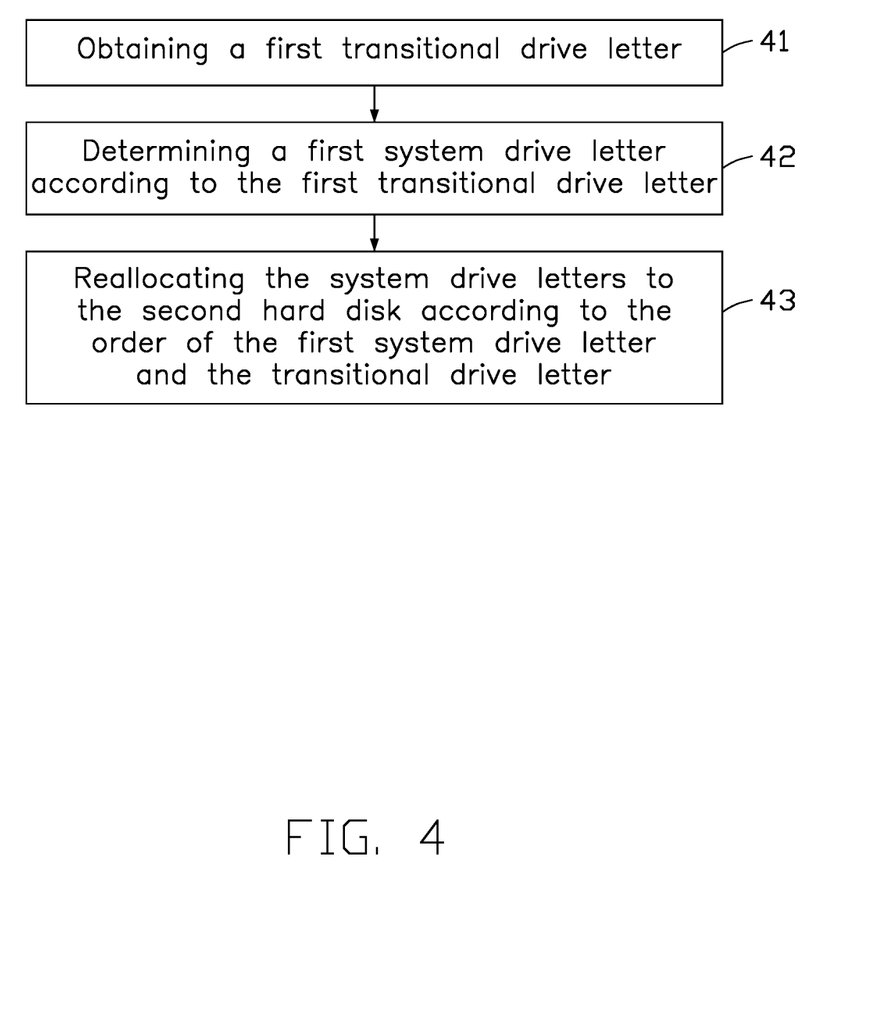
FIG. 4 is flowchart of another embodiment of method.

Referring to FIG. 4, in some embodiment, the method of reallocating the system letter to the second hard disk may include the following blocks 41 to 43:

At block 41, obtaining a first transitional drive letter.

The first transitional drive letter is the transitional drive letter at the first place in the order of slot number and/or partition number in the transitional drive letter generated in block 13.

When there are multiple second hard disks, there are multiple transitional drive letters. It is necessary to first obtain the transitional drive letter corresponding to the second hard disk inserted in the first slot of the multiple external slots according to the slot number, and then determine whether there is a partition in the second hard disk according to the partition information. If there is a partition, it is necessary to obtain the transitional drive letter with the smallest partition number as the first transitional drive letter according to the order of the partition numbers among the multiple transitional drive letters corresponding to the second hard disk. If there is no partition, the only transitional drive letter corresponding to the second hard disk is the first transitional drive letter.

When there is only one second hard disk, it is necessary to first determine whether there is a partition in the second hard disk according to the partition information. If there is a partition, it is necessary to obtain the transitional drive letter with the smallest partition number as the first transitional drive letter according to the order of the partition numbers among the plurality of transitional drive letters corresponding to the second hard disk. If there is no partition, the only transitional drive letter corresponding to the second hard disk is the first transitional drive letter.

At block 42, determining a first system drive letter according to the first transitional drive letter.

The first system drive letter is the system drive letter that is in first place when the system drive letter is reallocated. Since the first transitional drive letter is known, it can determine whether the first and second hard disks have partitions and the slot number of the external slot where the first second hard disk is located. Therefore, the present disclosure can determine whether the digital part corresponding to the partition number exists in the first system drive letter according to the first transitional drive letter, and also determine that the English part in the first system drive letter is the English part in the English alphabetic order.

For example, when the number of first hard disks is 2, and the first second hard disk have partitions, the first transition disk letter may be sdslot3part1, and slot3 indicates that the second hard disk is connected to the third slot of the server, that is, the first external slot. Part1 represents the first partition among the partitions of the second hard disk, the first system drive letter corresponding to the first transitional drive letter is sdc1, c corresponds to solt3 in the transition disk, it is the third letter in the English alphabet, and 1 corresponds to part1 in the transition disk letter.

For example, when there is one first hard disk, and the first second hard disk does not have partitions, the first transitional drive letter may be sdslot2, slot2 indicates that the second hard disk is connected to the second slot of the server, that is, the first external slot, the first system drive letter corresponding to the first transitional drive letter is sdb, and b corresponds to solt2 in the transition disk symbol, which is the second letter in the English alphabet.

For example, when there is one first hard disk, and the first second hard disk does not have partitions, the first transitional drive letter may be sdslot2part0, slot2 indicates that the second hard disk is connected to the second slot of the server, that is, the first external slot, part0 indicates that there is no partition in the second hard disk, the first system drive letter corresponding to the first transitional drive letter is sdb, and b corresponds to solt2 in the transitional drive letter, which is the second letter in the English alphabet.

At block 43, reallocating the system drive letters to the second hard disk according to the order of the first system drive letter and the transitional drive letter.

The present disclosure can determine the number of the system drive letters to be reallocated according to the number of the transitional drive letters. The present disclosure can determine whether the second hard disk has partitions according to the contents of the transition disk letter. The present disclosure can determine the order of the redistributed system drive letters according to the order of the slot number and the partition number in the transitional drive letter. Therefore, after the first system drive letter is determined, the system drive letters can be reallocated to the partitions of the second hard disk and the second hard disk in sequence from the first system drive letter.

The order of the transitional drive letters corresponds to the order of allocation of the transitional drive letters. The order of the transitional drive letters is sorted from small to large according to the slot number, and the transitional drive letters with the same slot number are sorted from small to large according to the partition number. The order of the reallocated system drive letters corresponds to the order of the transitional drive letters, and the order of the system drive letters is based on the order of the English letters from front to back. The system drive letters containing the same English letters are sorted from small to large according to the corresponding numbers of the partition number.

Figure 5:
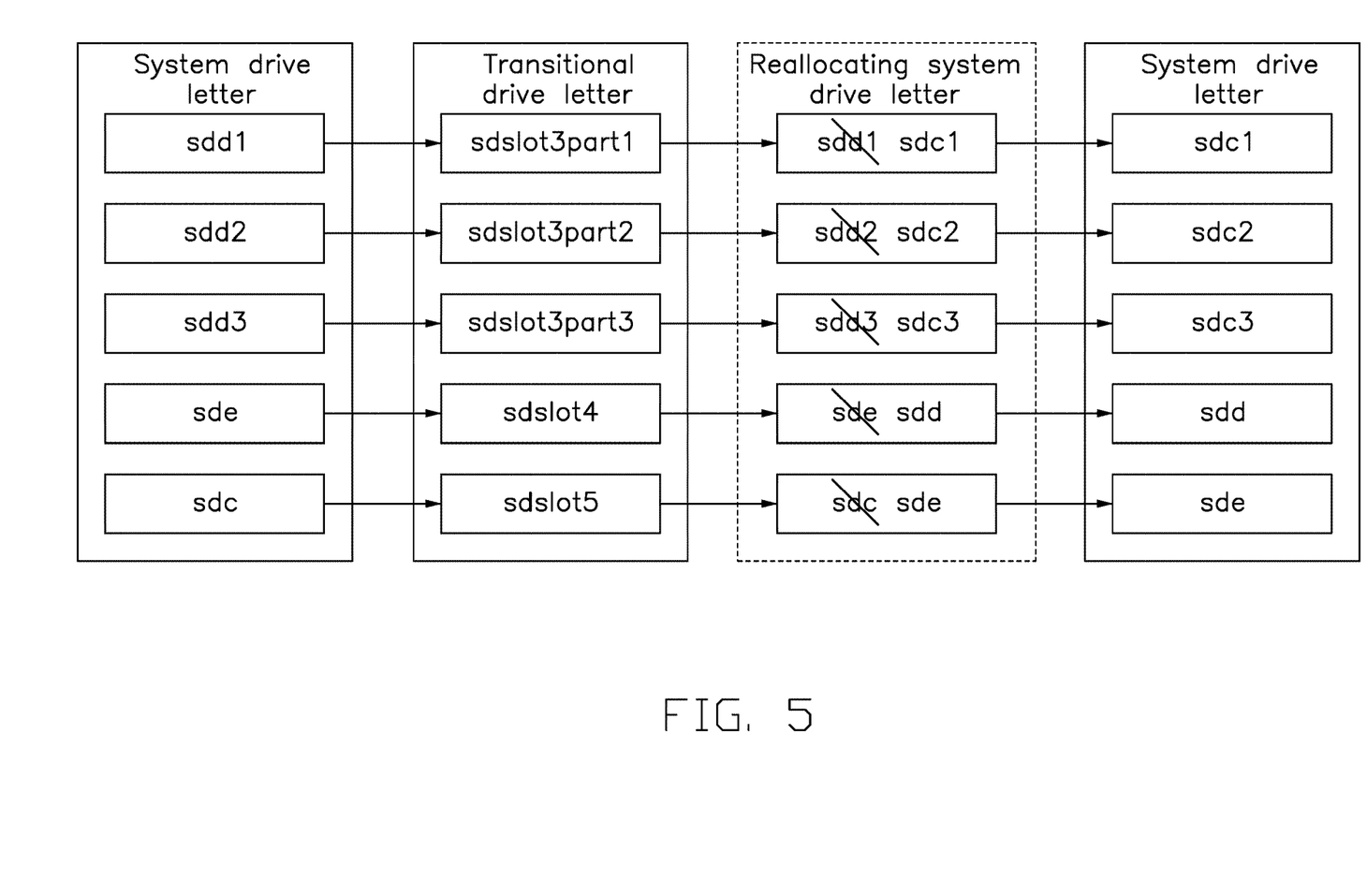
FIG. 5 is a block diagram of an embodiment of the drive letter allocation according to the present disclosure.

Referring to FIG. 5, for example, when there are multiple transitional drive letters, and the multiple transitional drive letters are sdslot3part1, sdslot3part2, sdslot3part3, sdslot4, and sdslot5, the first system drive letter is sdslot3part1. When the system drive letter is reallocated, the system drive letters sdc1, sdc2 and sdc3 are allocated to the three partitions of the second hard disk corresponding to the first system drive letter in the order of the partition number from small to large, c corresponds to slot3 in the transition disk symbol, which is the third letter in the English alphabet, 1 corresponds to part1 in the transitional drive letter, 2 corresponds to part2 in the transitional drive letter, and 3 corresponds to part3 in the transitional drive letter. Similarly, the system drive letters sdd and sde are allocated to the other two second hard disks in sequence, d corresponds to slot4 in the transition disk symbol, and d is the fourth letter in the English alphabetic order, e corresponds to slot5 in the transition disk symbol, and e is the fifth letter in the English alphabet.

In some scenarios, when multiple hard disks are plugged into multiple slots, there are empty slots between the hard disks. At this time, the slot number in the transitional drive letter may be non-continuous.

In the process of reallocating the transitional drive letter, the selected letters of the Chinese and English letters of the allocated system drive letter can be determined according to the order of the partition number from small to large in the multiple transitional drive letters, instead of selecting letters with the same order as the slot number value according to the slot number value.

For example, when there are multiple transitional drive letters, and the multiple transitional drive letters are sdslot3part1, sdslot3part2, sdslot5part1, sdslot5part2, and sdslot7 according to the slot number, the first system drive letter is sdslot3part1. The slots of the second hard disk are the third slot, the fifth slot, and the seventh slot, and there are vacant slots between the slots of the plurality of second hard disks. When reallocating the system drive letter, the system drive letters sdc1 and sdc2 are first allocated to the three partitions of the second hard disk corresponding to the first system drive letter in the order of the partition number from small to large, c corresponds to slot3 in the transition disk symbol, which is the third letter in the English alphabet, 1 corresponds to part1 in the transitional drive letter, and 2 corresponds to part2 in the transitional drive letter. Then allocate the drive letters sdd1 and sdd2 to the second hard disk corresponding to sdslot5part1 and sdslot5part2 in order, d corresponds to slot5 in the transition disk symbol, and 5 is the last digit in 3, 5, and 7, d is the letter 3+1 in the English alphabet order, i.e. the 4th letter. Similarly, the system drive letter sde is allocated to the second hard disk corresponding to sdslot7 in order, e corresponds to slot7 in the transition disk symbol. 7 in 3, 5, and 7 is the last two digits of 3, and e is the letter 3+2 in the English alphabetic order, i.e. the 5th letter.

When there are multiple transitional drive letters with different slot numbers, even if the slot numbers are not continuous, the corresponding system drive letters are still multiple system drive letters with sequential English letters.

The drive letter method provided by the embodiment of the present disclosure determines the slot where the hard disk is located and whether the hard disk has partitions, and if so number of partitions, partition serial numbers, and other information, and first allocates the transitional drive letter to each hard disk, and then reallocates the system drive letter to each hard disk according to the order of the transitional drive letter, to solve the problem of drive letter drift. The format of the reallocated system drive letter is the same as that of the original system drive letter, and when the operator needs to find the files in the specified hard disk, or when the system needs to retrieve the files in the specified hard disk, it does not need to consider drift of the drive letter to modify the directory where the files were originally found, and the specified files can be obtained while still in the original directory, it can improve the convenience of searching and calling files in the hard disk.

Figure 6:
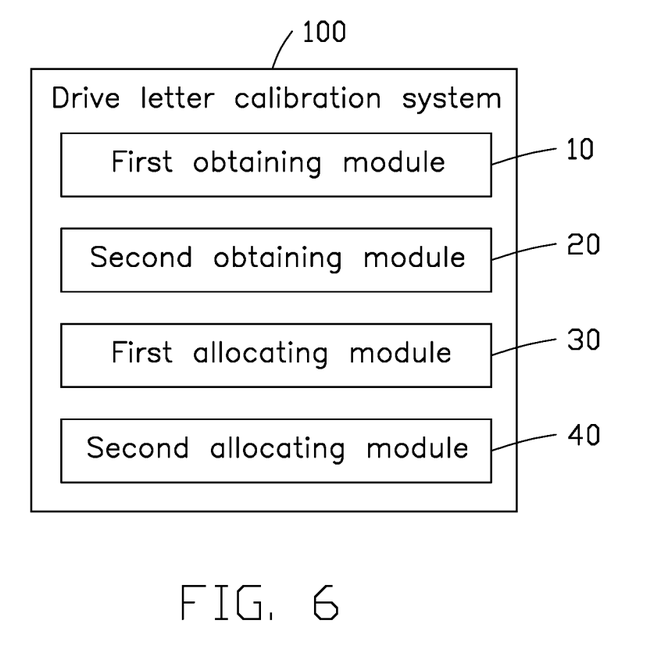
FIG. 6 is a block diagram of an embodiment of a system for allocating drive letter according to the present disclosure.

FIG. 6 illustrates a drive letter calibration system 100 in accordance with an embodiment of the present disclosure.

The drive letter calibration system 100 can include a plurality of modules. The plurality of modules can comprise computerized instructions in a form of one or more computer-readable programs that can be stored in a non-transitory computer-readable medium (such as a storage device of the computer device), and executed by at least one processor of the electronic device to implement calibrating function (described in detail in FIG. 1).

The drive letter calibration system 100 may include functional modules consisting of program code. The functional modules can include a first obtaining module 10, a second obtaining module 20, a first allocating module 30, and a second allocating module 40.

The first obtaining module 10 is configured to obtain a trigger signal.

The output end of the trigger signal may be the processor 50, the user terminal and/or the detection device, which is not limited in the embodiments of the present disclosure.

The second obtaining module 20 is configured to acquire the number of hard disks and device information.

Since the first hard disk cannot be hot-swapped but the second hard disk can be, the second obtaining module 20 acquires only the number and devices information of the second hard disk. The device information may include the slot information and the partition information.

The first allocating module 30 is configured to allocate a transitional drive letter for the hard disk according to the number of the hard disks and the device information.

The transitional drive letter may include a slot number and a partition number. The slot number may correspond to the slot information, and the partition number may correspond to the serial number of the hard disk partition in the partition information.

The second allocating module 40 is configured to reallocate the system drive letters to the hard disks according to the order of the transitional drive letters.

The transitional drive letter is sorted from small to large according to the slot number and the partition number. When reallocating the system drive letter, the system drive letter can be reallocated according to the order of the transitional drive letter and the partition of the hard disk. The method of reallocating the system drive letter is detailed in the above embodiments and will not be described here.

The above division of each module in the drive letter calibration system 100 is only for illustration. In other embodiments, the drive letter calibration system 100 can be divided into different modules as required to complete all or part of the functions of the drive letter calibration system 100.

In the embodiments of the present disclosure, the specific implementation of each module can also refer to the description of the method embodiments shown in FIGS. 1 to 5.

The drive letter calibration system 100 described in FIG. 6 can allocate a transitional drive letter to each hard disk, and then allocate a system drive letter to each hard disk according to the order of the transitional drive letter, to solve the problem of drive letter drift. The format of the reallocated system drive letter is the same as that of the original system drive letter, thus when the operator needs to find the files in the specified hard disk, or when the system needs to retrieve the files in the specified hard disk, it does not need to consider the drift of the drive letter to modify the directory where the files were originally found, and the specified files can be obtained while still in the original directory, it can improve the convenience of searching and calling up files in the hard disk. Refer to the specific embodiments of the above-mentioned drive letter calibration method which are not detailed here.

FIG. 7 illustrate an electronic device 200 in accordance with an embodiment of the present disclosure.

In one embodiment, the electronic device 200 can include the above drive letter calibration system 100. The drive letter calibration system is specifically described in FIG. 6.

The electronic device 200 can further include, but is not limited to, a storage device 60 and at least one processor 50. The processor 50 and the storage device 60 can be connected and communicate with each other through a communication bus. The processor 50 may execute the program code of program segment stored in the storage device 60 to implement blocks 11-14 in method shown in FIG. 1, blocks 21-22 in method shown in FIG. 2, blocks 31-33 in method shown in FIG. 3, and blocks 41-43 in method shown in FIG. 4. The processor 50 may execute the program code of program segment to implement the functions of a drive letter calibration system 100 shown in FIG. 6.

The modules 10-40 include computer instructions or codes in form of one or more programs that may be stored in the storage device 60, and which are executed by the at least one processor 50. In other embodiment, the modules 10-40 may also be a program instruction or firmware that is embedded in the processor 50.

The processor 50 may be a general-purpose central processing unit (CPU), a microprocessor, an application specific integrated circuit (ASIC), or one or more integrated circuits for controlling the execution of the above program.

The storage device 60 may be a read only memory (ROM) or other types of static storage devices that can store static information and instructions, a random access memory (RAM) or other types of dynamic storage devices that can store information and instructions, or an electrically erasable programmable read only memory (EEPROM) Compact disc read only memory (CD-ROM) or other optical disc storage, optical disc storage (including compressed optical disc, laser disc, optical disc, digital versatile disc, Blu ray disc, etc.), magnetic disk storage medium or other magnetic storage device, or any other medium that can be used to carry or store desired program codes in the form of instructions or data structures and can be accessed by a computer, but is not limited to this. The storage device 60 may be independent and connected to the processor 50 through a bus. The storage device 60 may also be integrated with the processor 50.

The storage device 60 is used for storing and executing the computer program 61 and is controlled by the processor 50 for execution. The processor 50 is configured to execute the computer program 61 stored in the storage device 60. The stored computer program 61 may perform some or all of the steps of the drive letter method described in FIGS. 1 to 5.

For example, the electronic device 200 may be a server, the processor 50 may be a central processor in the server, and the storage device 60 may be a first hard disk and a memory module in the server. The first hard disk stores a program for running the Linux system and also stores a computer program 61 for executing the method.

The electronic device 200 shown in FIG. 7 may allocate a transition disk letter to each hard disk, and then reallocate a system disk letter to each hard disk according to the order of the transition disk letter, to avoid the problem of disk letter drift. The format of the reallocated system drive letter is the same as that of the original system drive letter, thus when the operator needs to find the files in the specified hard disk, or when the system needs to retrieve the files in the specified hard disk, it does not need to consider the drift of the drive letter to modify the directory where the files were originally found, and the specified files can be obtained while still in the original directory, it can improve the convenience of searching and calling files in the hard disk.

Based on the same concept, the embodiments of the present application also provide a storage medium. A computer program 61 is stored in the readable storage medium. When the computer program 61 runs on the electronic device 200, the electronic device 200 can execute the disk letter method provided by the embodiments.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for calibrating drive letter configured for calibrating a system drive letter corresponding to a hard disk, and comprising:
   obtaining a number of the hard disk and device information; wherein the device information comprises slot information of the hard disk;
   allocating a transitional drive letter to the hard disk according to the number of the hard disk and the device information; wherein the transitional drive letter comprises a slot number corresponding to the slot information; and
   reallocating the system drive letter to the hard disk according to an order of the transitional drive letter.

2. The method according to claim 1, wherein reallocating the system drive letter to the hard disk according to an order of the transitional drive letter comprises:
   determining a first system drive letter according to a first transitional drive letter; wherein the first transitional drive letter is the transitional drive letter at a first place, the first system drive letter is the system drive letter that is in a first place in order when the system drive letter is reallocated; and
   reallocating the system drive letter to the hard disk according to the order of the first system drive letter and the transitional drive letter.

3. The method according to claim 1, wherein the device information comprises partition information, wherein allocating a transitional drive letter to the hard disk according to the number of the hard disk and the device information comprises:
   determining whether the hard disk has a partition according to the partition information; and
   allocating the transition disk letter to multiple partitions of the hard disk if the hard disk has partitions and allocating the transition disk letter to the hard disk if the hard disk does not have a partition.

4. The method according to claim 3, wherein the transitional drive letter comprises a partition transitional drive letter and a hard disk transitional drive letter, the partition transitional drive letter corresponds to the partition of the hard disk, the partition transitional drive letter comprises a slot number and a partition number, and the partition number corresponds to the partition information.

5. The method according to claim 1, further comprising:
   obtaining an installation location of the hard disk; and
   obtaining the number of the hard disk and the device information corresponding to the external slot in the installation location.

6. The method according to claim 1, further comprising:
   determining whether to obtain a trigger signal; and
   obtaining the number of the hard disks and the device information if the trigger signal is obtained.

7. The method according to claim 5, wherein obtaining the number of the hard disk and the device information corresponding to the external slot in the installation location comprises:
   obtaining a device directory corresponding to the external slot, wherein the device directory comprises a subdirectory, the subdirectory corresponds to the hard disk;
   obtaining the number of the hard disk according to a number of different device names in the device directory, wherein the device name is a part of the name of the subdirectory corresponding to the hard disk;
   obtaining the partition information of different hard disks according to content and number of partition names in the subdirectory with same device name in the device directory; wherein the partition name is a part of name of the subdirectory corresponds to the partition; and
   obtaining the slot information in the name of the subdirectory.

8. An electronic device comprising:
   a storage device; and
   at least one processor, wherein the storage device stores one or more programs, when executed by the at least one processor, the one or more programs cause the at least one processor to:
   obtain a number of the hard disk and device information; wherein the device information comprises slot information of the hard disk;
   allocate a transitional drive letter to the hard disk according to the number of the hard disk and the device information; wherein the transitional drive letter comprises a slot number corresponding to the slot information; and
   reallocate the system drive letter to the hard disk according to an order of the transitional drive letter.

9. The electronic device according to claim 8, wherein the at least one processor is further caused to:
   determine a first system drive letter according to a first transitional drive letter; wherein the first transitional drive letter is the transitional drive letter at a first place, the first system drive letter is the system drive letter that is in a first place in order when the system drive letter is reallocated; and
   reallocate the system drive letter to the hard disk according to the order of the first system drive letter and the transitional drive letter.

10. The electronic device according to claim 8, wherein the at least one processor is further caused to:
    determine whether the hard disk has a partition according to the partition information; and
    allocate the transition disk letter to multiple partitions of the hard disk if the hard disk has partitions and allocate the transition disk letter to the hard disk if the hard disk does not have a partition.

11. The electronic device according to claim 10, wherein the transitional drive letter comprises a partition transitional drive letter and a hard disk transitional drive letter, the partition transitional drive letter corresponds to the partition of the hard disk, the partition transitional drive letter comprises a slot number and a partition number, and the partition number corresponds to the partition information.

12. The electronic device according to claim 8, wherein the at least one processor is further caused to:
    obtain an installation location of the hard disk; and
    obtain the number of the hard disk and the device information corresponding to the external slot in the installation location.

13. The electronic device according to claim 8, wherein the at least one processor is further caused to:
    determine whether to obtain a trigger signal; and
    obtain the number of the hard disks and the device information if the trigger signal is obtained.

14. The electronic device according to claim 12, wherein the at least one processor is further caused to:
    obtain a device directory corresponding to the external slot, wherein the device directory comprises a subdirectory, the subdirectory corresponds to the hard disk;
    obtain the number of the hard disk according to a number of different device names in the device directory, wherein the device name is a part of the name of the subdirectory corresponding to the hard disk;

obtain the partition information of different hard disks according to content and number of partition names in the subdirectory with same device name in the device directory; wherein the partition name is a part of name of the subdirectory corresponds to the partition; and obtain the slot information in the name of the subdirectory.

15. A non-transitory storage medium having stored thereon instructions that, when executed by a processor of a computer device installed in an electronic device, causes the processor to perform a drive letter calibration method, wherein the method comprises:

obtaining a number of the hard disk and device information; wherein the device information comprises slot information of the hard disk;

allocating a transitional drive letter to the hard disk according to the number of the hard disk and the device information; wherein the transitional drive letter comprises a slot number corresponding to the slot information; and reallocating the system drive letter to the hard disk according to an order of the transitional drive letter.

16. The non-transitory storage medium according to claim 15, wherein reallocating the system drive letter to the hard disk according to an order of the transitional drive letter comprises:

determining a first system drive letter according to a first transitional drive letter; wherein the first transitional drive letter is the transitional drive letter at a first place, the first system drive letter is the system drive letter that is in a first place in order when the system drive letter is reallocated; and reallocating the system drive letter to the hard disk according to the order of the first system drive letter and the transitional drive letter.

17. The non-transitory storage medium according to claim 15, wherein the device information comprises partition information, wherein allocating a transitional drive letter to the hard disk according to the number of the hard disk and the device information comprises:

determining whether the hard disk has a partition according to the partition information; and allocating the transition disk letter to multiple partitions of the hard disk if the hard disk has partitions and allocating the transition disk letter to the hard disk if the hard disk does not have a partition.

18. The non-transitory storage medium according to claim 17, wherein the transitional drive letter comprises a partition transitional drive letter and a hard disk transitional drive letter, the partition transitional drive letter corresponds to the partition of the hard disk, the partition transitional drive letter comprises a slot number and a partition number, and the partition number corresponds to the partition information.

19. The non-transitory storage medium according to claim 15, further comprising:

obtaining an installation location of the hard disk; and obtaining the number of the hard disk and the device information corresponding to the external slot in the installation location.

20. The non-transitory storage medium according to claim 15, further comprising:

determining whether to obtain a trigger signal; and obtaining the number of the hard disks and the device information if the trigger signal is obtained.

* * * * *